United States Patent
Ito et al.

(10) Patent No.: US 8,182,755 B2
(45) Date of Patent: May 22, 2012

(54) METHOD FOR GENERATING OZONE USING HEMIMORPHIC CRYSTAL AND APPARATUS FOR THE SAME

(75) Inventors: Yoshiaki Ito, Kyoto (JP); Shinzo Yoshikado, Kyoto (JP); Yoshikazu Nakanishi, Shiga (JP)

(73) Assignees: Kyoto University, Kyoto (JP), part interest; The Doshisha, Kyoto (JP), part interest; Yoshikazu Nakanishi, Shiga (JP), part interest ( * ) Notice: Subject to any disclaimer, the term of this patent is extended or adjusted under 35 U.S.C. 154(b) by 1209 days.

(21) Appl. No.: 11/986,443

(22) Filed: Nov. 21, 2007

(65) Prior Publication Data
US 2008/0156634 A1    Jul. 3, 2008
US 2012/0085637 A9    Apr. 12, 2012

Related U.S. Application Data

(63) Continuation of application No. PCT/JP2006/310469, filed on May 25, 2006.

(30) Foreign Application Priority Data

May 25, 2005    (JP) ................................. 2005-151900

(51) Int. Cl.
*B01J 19/08* (2006.01)
(52) U.S. Cl. .................... 422/186.07; 422/186; 204/176
(58) Field of Classification Search ............. 422/186.07, 422/186; 204/176
See application file for complete search history.

(56) References Cited

U.S. PATENT DOCUMENTS

| 3,840,748 | A |   | 10/1974 | Braunlich |
| 6,019,949 | A | * | 2/2000  | Dunder ..................... 422/186.07 |
| 6,432,279 | B1| * | 8/2002  | Zanta ......................... 204/157.5 |

FOREIGN PATENT DOCUMENTS

| JP | 63-085004   | 4/1988  |
| JP | 2005-174556 | 6/2005  |
| JP | 2005-281081 | 10/2005 |

OTHER PUBLICATIONS

Brownridge ("Electron and Positive Ion Beams and X-rays Produced by Heated and Cooled Pyroelectric Crystals such as LiNbO3 and LiTaO3 in dilute Gases: Phenomenology and Applications", http://www.bingbamton.edu./physics/Brownridge%20Summary.pdf, 2004.*
*X-Ray Emission From Ferroelectric Crystals, LiNbO$_3$ or LiTaO$_3$ Under Thermal Treatment*, 49$^{th}$, 2004, pp. 56-57.
*Excitation of X-Rays Using Polarized LiNbO$_3$ Single Crystal*, Preprints of Annual Meeting of the Ceramic Society of Japan, Mar. 2005, p. 167.

* cited by examiner

*Primary Examiner* — Kishor Mayekar
(74) *Attorney, Agent, or Firm* — Kirschstein, et al.

(57) ABSTRACT

A method and apparatus for easily generating ozone with a high concentration in the air without requiring a high voltage power supply or a vacuum apparatus, wherein an ozone gas with a high concentration is generated in the atmosphere around a hemimorphic crystal of which the direction of polarization is uniform by placing the crystal in the air and repeatedly heating and cooling the crystal, are provided.

5 Claims, 4 Drawing Sheets

METHOD FOR GENERATING OZONE USING HEMIMORPHIC CRYSTAL AND APPARATUS FOR THE SAME

CROSS REFERENCE TO RELATED APPLICATIONS

This application is a continuation of International Application No. PCT/JP2006/310469, filed on May 25, 2006, which in turn claimed the priority of Japanese Patent Application Serial No. 2005-151900, filed on May 25, 2005.

TECHNICAL FIELD

This invention provides a method for generating ozone in the air using a high electrical field generated around a hemimorphic crystal by thermally exciting the crystal, as well as an apparatus for the same, and in particular, a method for generating ozone with a high concentration in a normal pressure of atmosphere, as well as an apparatus for the same.

BACKGROUND ART

The present inventors invented an apparatus for generating X-rays by placing a hemimorphic crystal, for example a lithium niobate ($LiNbO_3$) single crystal, which is known as a pyroelectric crystal, in a vacuum of approximately 3 Pa to 6 Pa or a low gas pressure atmosphere, periodically changing the temperature of this crystal so that charged particles, including electrons are generated on the surface of the crystal because the particles that cannot follow the offset of the charge on the surface collide with a target or a hemimorphic crystal, and thus, generating X-rays (Japanese Patent Application No. 2003-407985 and Japanese Patent Application No. 2004-98371), and invented an apparatus for generating ozone by radiating X-rays into an air flow including oxygen through a beryllium window or the like (Japanese Patent Application No. 2004-99069).

Furthermore, the present inventors invented an apparatus for generating ozone more efficiently by using strong X-rays generated through bremsstrahlung from an X-ray target where an electron gun for generating thermoelectrons is provided together with a hemimorphic crystal within a vacuum housing as described above so that the thermoelectrons from this electron gun are directed so as to collide with the target using a high electrical field generated through the change in the temperature of the crystal (Japanese Patent Application No. 2005-94742).

(Patent Document 1) Japanese Patent Application No. 2003-407985
(Patent Document 2) Japanese Patent Application No. 2004-98371
(Patent Document 3) Japanese Patent Application No. 2004-99069
(Patent Document 4) Japanese Patent Application No. 2005-94742

DISCLOSURE OF THE INVENTION

This invention was achieved by developing a means for converting the air around a hemimorphic crystal directly to ozone in a gas atmosphere under an atmospheric pressure or a high pressure exceeding this as a result of research conducted on thermionic effects resulting from thermal excitation of a hemimorphic crystal as that described above and the behavior of charged particles, and provides a method for easily generating ozone with a high concentration in the air without requiring a high voltage power supply, vacuum equipment and the like, as well as an apparatus for the same.

The first invention for solving the above described problem provides a method for generating ozone characterized in that a hemimorphic crystal polarized in one direction is thermally excited so that a high electrical field is generated in the air around the crystal, and compound effects of dissociation and association phenomena of oxygen molecules in the air caused by this high electrical field, phenomena of inter-particle collision between charged particles around the crystal, and phenomena of soft X-ray release and discharge through collision of charged particles with the crystal are used, and thus, ozone is generated in the air with a high concentration.

Furthermore, the second invention provides an apparatus configuration for effectively achieving compound effects of dissociation and association of charged particles and oxygen molecules in the air as described above, and provides an ozone generator characterized in that a hemimorphic crystal polarized in one direction is placed in a housing which seals the air under a normal pressure or a pressure exceeding this in such a manner that one of the end faces in the polarization directly faces the air and a thermal excitation means for periodically heating and cooling this crystal is provided.

Furthermore, the present invention provides a method and an apparatus for generating ozone characterized in that a plurality of hemimorphic crystals are provided in a housing which seals the air, and the crystals are separately thermally excited with shifted phases of heating and cooling cycles.

As the hemimorphic crystals used in the present invention, lithium tantalate ($LiTaO_3$), lithium niobate ($LiNbO_3$) and the like are effective, and other pyroelectric crystals can also be used.

As the means for thermally exciting the crystals, Pelletier effect elements are preferable, and placed in such a manner that the heat emitting surface or the heat absorbing surface makes contact with the rear side of the crystal (the side opposite to the surface facing the air), and the polarity of the current applied to these Pelletier elements is periodically switched, and thus, the crystal can be heated or cooled in a constant time cycle, which is effective.

In addition, as this heating and cooling period, it is better to set the heating period shorter than the cooling period in the case where the crystal is placed so that the negative electrical surface faces the air. A thermal excitation cycle in which the crystal is heated for approximately 30 minutes and then cooled for approximately 90 minutes, for example, is applicable.

As the temperature for the above described heating and cooling, it is effective to repeat heating and cooling at a temperature between a temperature that is low to such an extent that water vapor in the air is not condensed and a temperature below the Curie point (Curie temperature).

In order to industrially and commercially use the generated ozone, an oxygen containing gas (air or the like) is continuously introduced into a housing where a hemimorphic crystal is installed according to the present invention via a pipe or the like while an ozone containing gas gained inside the housing through ozonization is guided to a desired location, for example to a sterilizing chamber, from the housing through a leading pipe with an opening and closing valve.

In this case, it is desirable to install an ozone concentration measuring instrument, in order to monitor the state of ozonization of the gas inside the housing, so that the valve of the leading pipe is controlled on the basis of the output, and an ozone gas with a desired concentration is sent out.

As described above, according to the present invention, the air can be efficiently ozonized simply by thermally exciting a hemimorphic crystal, and therefore, ozone can be easily generated with a high concentration, without requiring any special equipment, such as a vacuum apparatus, a high voltage power supply and the like, and without using an X-ray target, such as of a heavy metal.

That is to say, the present invention can easily be applied for various purposes, such as sterilization, disinfection and air purification, which use ozone, and therefore, can be widely applied in sanitation equipment, for example in convenience stores, restaurants and hotels, and in industrial facilities where oxidization processes and the like are carried out on metals and semiconductors in the industry.

EXPLANATION OF SYMBOLS

Figure 1:
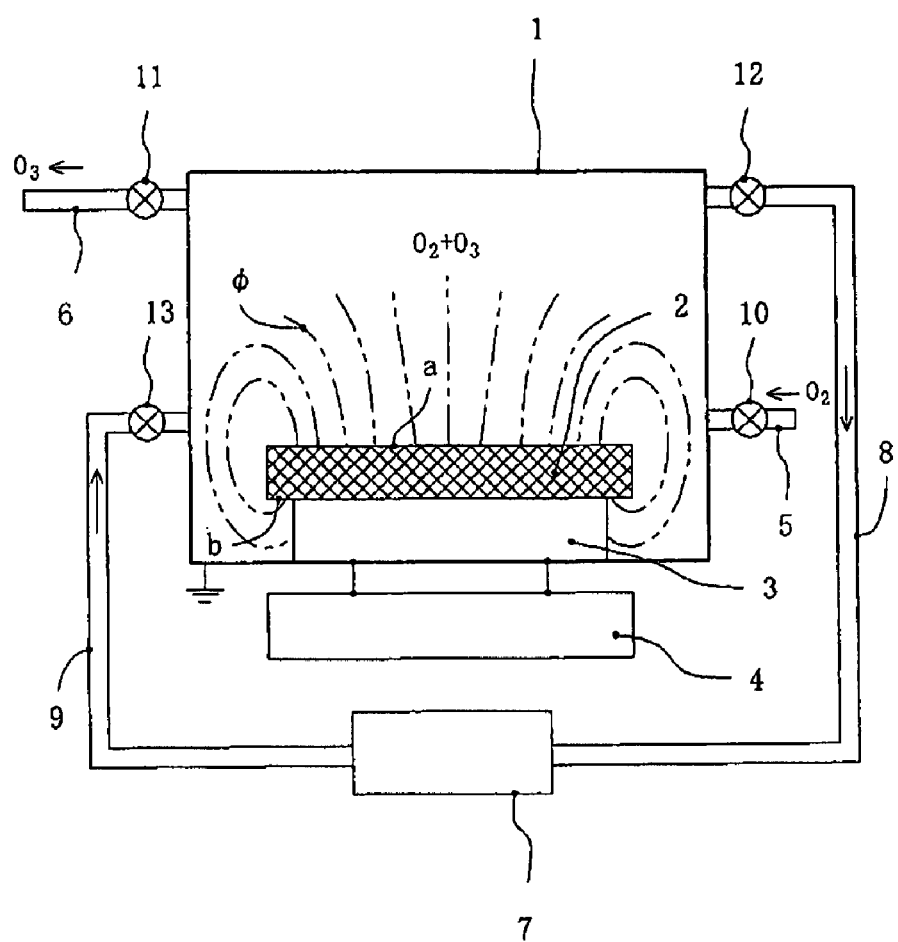
FIG. 1 is a diagram showing an example of an experiment illustrating the basic concept of the method and apparatus according to the present invention.

1. Housing
2. Hemimorphic crystal having uniform polarization direction
3. Heating and cooling stage for crystal (means for thermal excitation)
4. Temperature control circuit
5. Pipe for introducing gas into housing
6. Pipe for leading out gas from housing
7. Ozone concentration measuring instrument
8, 9. Gas circulation paths
10, 11, 12, 13. Opening and closing valves
A, B, C, D, E. Hemimorphic crystals
A', B', C', D', E'. Means for thermal excitation

BEST MODE FOR CARRYING OUT THE INVENTION

In the following, the embodiments of the present invention are described in reference to the drawings.

FIG. 1 is a diagram showing an example of an experiment illustrating the basic concept of the method and apparatus for generating ozone according to the present invention; the reference numeral 1 indicates a housing which contains the air in a normal pressure state, and the reference numeral 2 indicates a hemimorphic crystal of lithium tantalate (LiTaO3), lithium niobate (LiNbO3) or the like, and a block crystal in columnar form having a diameter of 75 mm and a thickness of 20 mm was used for the experiment. This crystal was fabricated at a stage of crystal growth in so that it was polarized in one direction with the upper surface having a negative polarity. The reference numeral 3 indicates a heating and cooling stage which is installed on the lower surface b (surface which is charged positive in the direction of polarization) of the crystal and formed of a Pelletier element or the like. The reference numeral 4 indicates a circuit for controlling a current that flows to this Pelletier element with which the crystal is heated or cooled by switching the polarity of the applied voltage. The heating and cooling cycle and the temperature for heating are programmed and controlled to the conditions preset by the control circuit 4. The reference numeral 5 indicates a pipe for supplying a gas under an atmospheric pressure (air or the like), the reference numeral 6 indicates a pipe for leading out the ozonized gas, and the reference numeral 7 indicates an ozone concentration measuring instrument which is connected to the inside of the housing 1 via pipes 8 and 9. The reference numerals 10, 11, 12 and 13 indicate opening and closing valves for the respective pipes.

The apparatus shown as an example is formed in such a manner that the air supplied into the housing through the pipe 5 passes through the circulation path 8 and the ozone measuring instrument 7 and refluxes into the housing from the circulation path 9, and the valve 11 is opened when it is confirmed that the state is such that the concentration of ozone inside the housing is a desired concentration, and thus, the ozone gas with a desired concentration is supplied from this apparatus to another location, for example to a sterilizing chamber, where ozone processing is carried out.

The operation for generating ozone in the air inside the housing is described using the apparatus shown.

The hemimorphic crystal, of which the direction of polarization is uniform, is installed so that the negative electrical surface a faces the upper side (air side) and the positive surface b faces the lower side (heating and cooling stage side). First, a current is applied, so that the heat emitting surface of the heating and cooling stage 3 made of a Pelletier element becomes the lower surface b of the hemimorphic crystal, and thus, the crystal 2 is rapidly heated, so that the temperature rises to approximately 200° C. Next, the polarity of the current applied to the Pelletier element is switched, so that the heat absorbing surface of the element faces the surface b of the crystal, and thus, the temperature of the crystal is forcibly lowered to a temperature close to room temperature.

This operation for raising and lowering the temperature of the crystal is automatically controlled by the circuit 4 for controlling a current that flows to the Pelletier element. According to the control, an operation for first heating the crystal for approximately 30 minutes and then lowering the temperature for approximately 90 minutes is repeated in a cycle of approximately 2 hours, for example. Though the highest temperature during this heating is ideally a temperature close to the Curie point of the crystal, in practice, it is efficient to set the highest temperature to which the material is resistant or lower (for example approximately 250° C.).

Here, the housing 1 in the figure can be formed of appropriate members, such as metals, reinforced plastics, FRP's and the like, which can bear an atmospheric pressure, and it is desirable for it to be able to adsorb only a small amount of ozone and bear the strong oxidizing properties of ozone.

Figure 2:
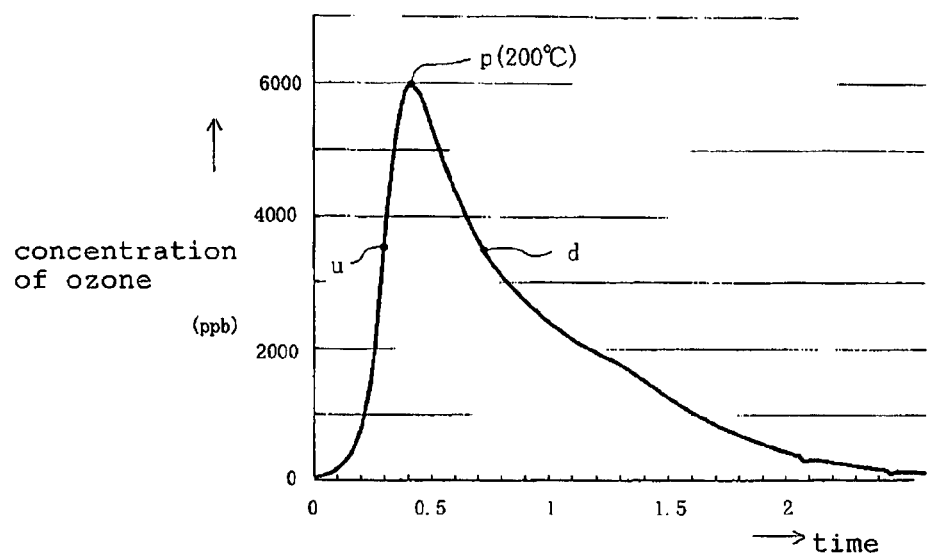
FIG. 2 is a graph showing the relationship between the change in the temperature of the crystal in the air and the concentration of the generated ozone in the example of an experiment of FIG. 1.

FIG. 2 shows data gained by measuring the concentration of ozone generated inside the housing 1 through the above described operation by the ozone concentration measuring instrument 7; the longitudinal axis indicates the concentration of ozone (ppb) inside the housing, and the lateral axis indicates the time for heating and cooling the crystal (h).

It was proven that in the case where the crystal 2 is heated so that the temperature changes along the curve u starting from room temperature to approximately 200° C., and after that, the temperature lowers along the curve d to a temperature close to room temperature (natural cooling), the concentration of ozone inside the housing reaches 6000 ppb at the top p (vicinity of 200° C.) of the curve. That is to say, generation of ozone rapidly progresses at the stage where the temperature of the crystal rises; that is, for approximately 30 minutes, and after that, the concentration of ozone generated inside the housing lowers at the stage where the temperature lowers; that is, for approximately 90 minutes.

Accordingly, in order to gain ozone with a high concentration, the gas is taken out through the leading pipe 6, by opening the valve 11 when the measured value of the concentration becomes 6000 ppb, and in the case where the concentration is lower, the valve 11 at the outlet may be left open between 15 minutes after the start of heating to approximately 60 minutes after the start of heating.

Next, the mechanism for generating a high electrical field as the temperature of the hemimorphic crystal changes and generating ozone under an atmospheric pressure using this is described.

The principle of generation of a high electrical field resulting from change in the temperature of the crystal and the phenomenon of ozone generation in the case where a hemimorphic crystal of which the direction of polarization is uniform is installed so that the negative electrical surface faces the upper side (air side) and the positive surface faces the lower side (heating and cooling stage side) are described below.

I. When the Temperature of the Crystal is in the Rising Process (During the Heating Process)

When the temperature of the crystal is first raised, the polarizability of the crystal becomes lower and the negative charge density on the negative surface becomes lower. In the state of equilibrium at room temperature, this negative surface adsorbs positive ions (protons, hydronium ions and the like) of which the amount is the same as the negative charge. Though the rate of thermal desorption increases as the temperature rises, the rate at which the polarizability lowers is higher, and consequently, the negative surface is charged positive by the above described positive ions. The positive electrical surface side on the rear surface is generally charged negative, irrespectively of whether the stage 3 is grounded or not grounded.

As a result, lines of electric force are generated inside the crystal, in the direction from the negative surface (upper surface a) toward the positive surface (lower surface b), and a high electrical field is generated outside the crystal from the negative surface side toward the air, as shown by the lines of electric force $\phi$ in FIG. 1. The greater the change in the temperature of the crystal is (the greater the gradient of rise in a temperature is), the more intense this electrical field becomes.

Next, the mechanism for generating ozone using the high electrical field is described in the following.

(1) The intense electrical field ionizes a part of the gas around the crystal, so that the released electrons collide with the surface of the crystal, generating X-rays with continuous wavelengths corresponding to the intensity of the electrostatic energy (converted to kinetic energy) and characteristic X-rays of the elements which compose the crystal. In the case of the present invention, the space inside the housing has an atmospheric pressure, and therefore, the mean free path of the above described electrons becomes short (approximately 70 nm in the case where the electrons are in the air) and the electrons do not sufficiently accelerate, even as a result of the high electrical field (kinetic energy is small), and therefore, the wavelength of the generated X-rays becomes very long and the majority of X-rays become soft X-rays. The energy of these soft X-rays is absorbed in the air, because the pressure of the gas is high and the soft X-rays do not leak to the outside of the housing, and thus, there is little risk to living bodies.

(2) These soft X-rays are absorbed by oxygen molecules in the air, and therefore, a part of the oxygen molecules is dissociated. As a result, free oxygen single atoms in an excited state are generated in the air, and these associate with other oxygen ions, so that ozone is generated. In general, a large number of photons of oxygen having the same wavelength as ultraviolet rays are absorbed, and photons of soft X-rays have a further greater energy, and therefore, one photon of soft X-rays excites and dissociates a number of oxygen molecules and as a whole, these soft X-rays increase the efficiency of ozone generation, and thus, can generate ozone in the air with a high concentration.

(3) Furthermore, charged particles, such as ions, electrons and the like, which have been thermally dissociated from the crystal due to the high electrical field caused by the crystal as described above (thermal ion effects) collide with gas molecules around the crystal, causing discharge. As a result of this discharge, a type of atmospheric pressure plasma phenomenon can be observed around the crystal, and it is considered that oxygen molecules in the air are ozonized. This discharge phenomenon can be generated only in the vicinity of the crystal, because the mean free path of the charged particles is short, due to the high pressure of the gas, and therefore, ozonization progresses mainly in the vicinity of the crystal.

For the above described reasons, when the temperature of the crystal rises, ozonization progresses efficiently in the air, due to the compound effects of the above described (1), (2) and (3).

II. When the Temperature of the Crystal is in the Lowering Process (During the Cooling Process)

During the process where the temperature of the crystal lowers, generation of ozone progresses in the same manner, though the efficiency of ozonization slightly lowers.

(4) When the temperature lowers, the polarizability of the crystal increases and the negative charge density becomes higher on the negative electrical surface, which therefore is generally negatively charged. The positive surface on the rear side is generally positively charged, irrespectively of whether or not the stage is grounded. Accordingly, lines of electric force (electrical field) are generated in the direction from the positive surface toward the negative surface inside the crystal, and an electrical field directed from the positive charge on the metal surface of the heating and cooling stage and the housing toward the negative surface of the crystal is generated within the space. This electrical field ionizes a part of the gas molecules in the air in the same manner as described above, so that the electrons collide with the housing and the like, generating X-rays. However, the flight path of the electrons is significantly limited, due to the high pressure inside the housing, and thus, only a part of the electrons collide with nearby gas molecules, and X-rays generated from this excite gas molecules, thus generating ozone.

That is to say, in the same manner as when the temperature rises, oxygen molecules in the air are dissociated by a high electrical field as described above, and the generated oxygen single atoms in an excited state associate with other oxygen ions, so that ozone is generated.

Thus, ozone generation slightly progresses when the temperature lowers, and the amount of ozone generated is relatively small, as shown in the graph of FIG. 2.

As described above, both during the process where the temperature of the crystal rises and during the process where the temperature of the crystal lowers, ozone can be generated in the air through the above described operations (1) to (4), and as a result of the experiments by the present inventors, it was proven that a much greater amount of ozone is generated when the temperature of the crystal rises.

In addition, it was also found that the greater the gradient of the rise in a temperature is when the temperature rises, that is to say, the more extreme the change in the temperature is, the more the efficiency of ozone generation increases.

A case where the crystal is placed so that the negative electrical surface faces the upper side (air side) is described in the above. In the case where the crystal is placed so that the direction of polarization thereof is reversed and the upper surface is positively charged, opposite phenomena can be observed when the temperature rises and when the temperature lowers. That is to say, though the efficiency of ozone generation improves at the stage where the temperature lowers, the gradient of the drop in a temperature cannot be made so steep, and therefore, it is usually more efficient to use the crystal with the upper surface negatively charged.

Though in general, the higher the pressure of the gas is, the greater the amount of ozone generated becomes, the mean free path of colliding charged particles becomes smaller, and therefore, the region where ozone is generated becomes smaller as the pressure increases. Accordingly, an appropriate gas pressure is selected in accordance with the intended use for the ozone, and a function of stirring the gas may be added if necessary, so that ozone generation is accelerated in a wider region.

Figure 3:
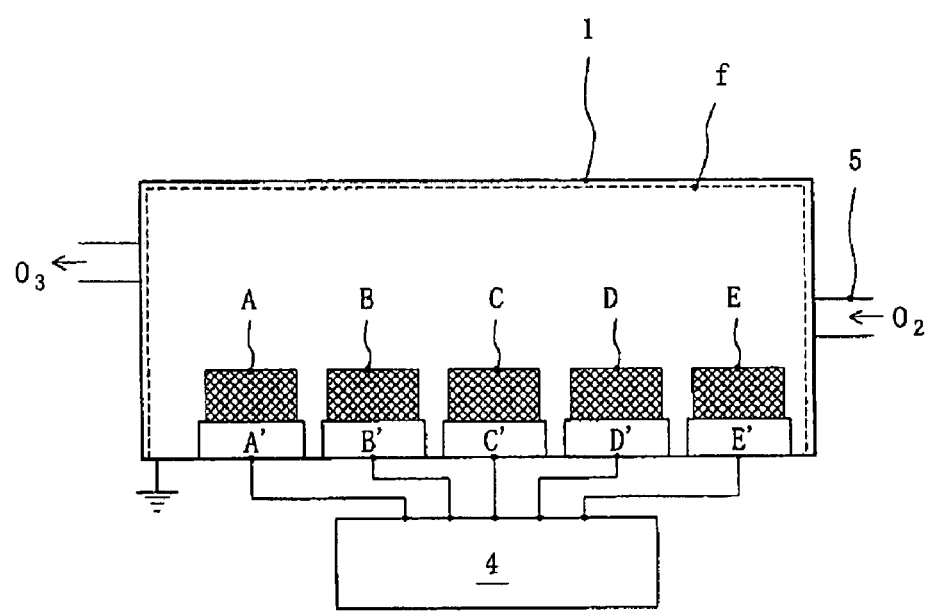
FIG. 3 is a diagram showing one embodiment of an apparatus for continuously generating and supplying ozone according to the present invention.

FIG. 3 shows an embodiment where the air inside the housing is continuously and efficiently ozonized, focusing on the efficiency of ozone generation when the temperature of the crystal rises as in the above.

In the figure, the reference numeral 1 indicates a housing into which air with a normal pressure is continuously introduced and from which the air with a normal pressure is led out, and on the inside of which five hemimorphic crystals A, B, C, D and E of lithium tantalate (LiTaO3) having the same rating and means for thermally exciting each A', B', C', D' and E' are installed side by side so that the timing according to which each crystal is heated and cooled is controlled with a time difference by the control circuit 4. That is to say, this is an example where the phases for thermal excitation are shifted, and thus, a state where the efficiency of ozone generation is high is continuously maintained.

Figure 4:
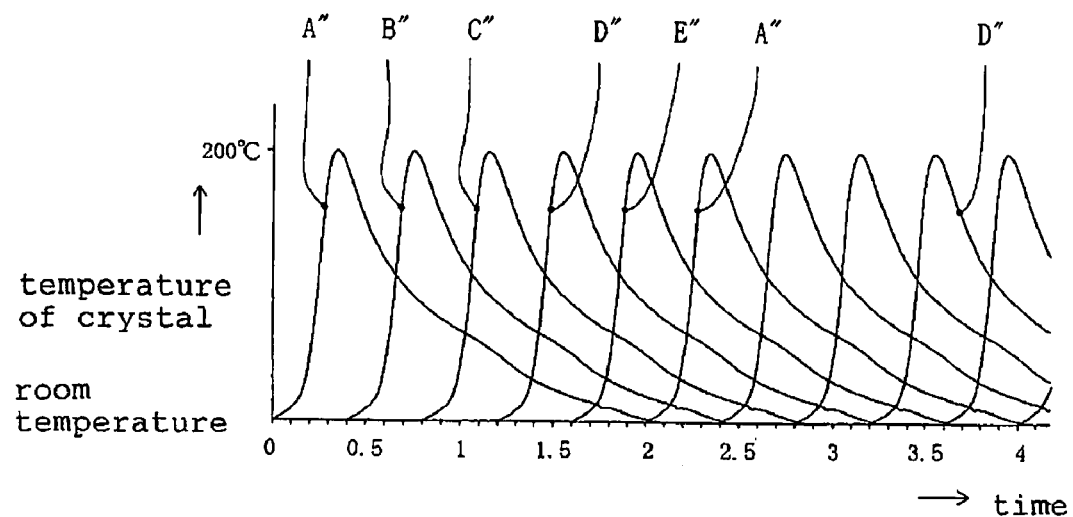
FIG. 4 is a graph showing the relationship between the thermal excitation cycle of the respective crystals and the temperature of the crystals in the embodiment of FIG. 3.

FIG. 4 is a graph showing the thermal excitation cycle of the respective crystals A, B, C, D and E, where the longitudinal axis indicates the temperature of the crystal, the lateral axis indicates the time for heating and cooling, and A", B", C", D" and E" indicate curves for the temperature for heating and cooling the respective crystals A, B, C, D and E.

As can be seen from the graph, each crystal is heated to 200° C. for approximately 0.4 hours and the temperature is controlled so as to return to room temperature for approximately 1.6 hours, and heating and cooling are repeated with a time difference of 120/5 minutes between each. In the control for heating and cooling the crystals, each crystal is heated and cooled with a phase difference via means for thermal excitation A', B', C', D' and E', which are, for example, Pelletier elements, on the basis of signals from the control circuit 4.

In this configuration, the respective crystals have, in sequence, a temperature rising process where the efficiency of ozonization is high, and therefore, ozonization continuously progresses inside the housing, in such a manner that oxygen in the air introduced through the air introducing pipe 5 is continuously converted to ozone without interruption, and an ozonized gas can be taken out from the outlet pipe 6 with a high concentration.

Though an example where five hemimorphic crystals are placed two-dimensionally is described in reference to the figure, a greater number of crystals may be placed two-dimensionally or three-dimensionally, and by doing so, an ozone gas can be continuously generated with higher concentration.

In addition, it becomes possible to easily adjust the period of the heating and cooling cycle and the highest temperature reached when the temperature rises with precision in accordance with the target concentration and the application of the ozone when a Pelletier effect element is used as a means for thermal excitation.

Here, in the case where the housing 1 in FIG. 3 is made of a metal, it is desirable to coat the inside with a fluorine resin, as shown by the dotted line f, or use an appropriate antioxidant, in order to prevent oxidation and corrosion by the generate ozone, as well as in order to prevent consumption of ozone due to this.

Here, though a heating and cooling apparatus using a Pelletier element is illustrated as a means for thermally exciting the crystal in the embodiments of the present invention, heaters, microwave heating systems and laser systems may be combined with various types of cooling mechanisms, and in addition, it is possible to use a means for generating an electrical field using disturbed polarization by causing electrical distortion or applying mechanical pressure in the crystal together.

As described above, the basic concept of the present invention is a mechanism for generating ozone where a hemimorphic crystal of which the direction of polarization is made uniform in advance is used, and disturbance is caused on the outside in a state of electrical equilibrium, so that the change in spontaneous polarization generated within the crystal through thermal excitation cannot be kept up with, and thus, an intense electrical field is generated on the inside and the outside of the crystal, and therefore, no high electrical field which is effective for ozone generation or phenomenon of discharge of charged particles can be observed in a neutralized crystal (stoichiometric crystal) in which electric dipole moments are randomly distributed, even when the crystal is thermally excited.

In addition, it is important to change the temperature of the crystal at any temperature, and a high electrical field is not generated when the temperature is constant, even if a high temperature is maintained, and therefore, sufficient effects of ozone generation are not gained.

A method for controlling the process of crystal growth at the stage of growth and a method for making the crystal to be polarized in one direction by electrically processing the crystal are known as a method for gaining a crystal polarized in one direction.

As described above, in the embodiments of the present invention, ozone is generated in an atmosphere where the gas pressure around the crystal has a normal pressure or a pressure higher than this using the compound effects of soft X-rays generated by thermions dissociated as a result of imbalance in the charge caused by thermal excitation of the crystal (thermionic effects) and dissociation and association of oxygen molecules in the high electrical field, where the atmosphere around the crystal has a normal pressure or a pressure higher than this, unlike vacuums, and therefore, oxygen is in a state of concentration and the mean free path of the charged particles becomes short, making collision of the charged particles with gas molecules in the vicinity of the crystal and dissociation of the molecules easy, which works together with the discharge and plasma effects resulting from collision between molecules, and thus, the efficiency of conversion of oxygen molecules to ozone can be increased. Furthermore, it is quite natural to gain an ozone gas with higher concentration continuously by introducing a gas of which the oxygen content is particularly high into the generation portion (housing).

Though the above described embodiments illustrate one type of ozone generator which is relatively compact and simple, a case where a large amount of ozone is required, such as for large-scale semiconductor processes or for purification of large-scale devices and large-scale members can be easily dealt with by increasing the size of the housing and the number of crystals. In this case, it is not necessary to make the atmosphere a vacuum, and therefore, corresponding modification is easy.

The invention claimed is:

1. A method of generating ozone using hemimorphic crystals, comprising the steps of:
   placing a plurality of the hemimorphic crystals in an atmosphere of atmospheric pressure or higher, each of the hemimorphic crystals being polarized in one direction;
   periodically heating and cooling the hemimorphic crystals while shifting a phase of the periodic heating and cooling for each hemimorphic crystal so as to generate a high electrical field in a vicinity of each of the hemimorphic crystals; and
   ozonizing oxygen molecules in the atmosphere by compound effects of soft x-rays generated by the high electrical fields and dissociation and recombination of the oxygen molecules in the atmosphere.

2. The method of generating ozone according to claim 1, wherein the periodic heating and cooling step is performed at a temperature in a range from room temperature to a temperature lower than the Curie temperature of the hemimorphic crystals.

3. An ozone generator using hemimorphic crystals, comprising:
   a housing for maintaining an atmosphere of atmospheric pressure or higher therein;
   a plurality of the hemimorphic crystals polarized in one polarization direction and placed in the housing such that each of the hemimorphic crystals has an end face that directly faces the atmosphere in said one polarization direction; and
   means for periodically heating and cooling the hemimorphic crystals while shifting a phase of the periodic heating and cooling for each hemimorphic crystal so as to generate a high electrical field around each of the hemimorphic crystals, whereby oxygen molecules in the housing are ozonized by soft x-rays and charged particles which are generated in the high electrical fields around the hemimorphic crystals.

4. The ozone generator according to claim 3, wherein the means for periodically heating and cooling comprises a Pelletier effect element placed on one surface of each of the hemimorphic crystals, and means for periodically switching a polarity of a current applied to each of the Pelletier effect elements.

5. The ozone generator according to claim 3, and further comprising means for continuously supplying a gas such as air including oxygen into the housing; means for discharging a gas containing ozone generated in the housing to a desired location; means for detecting a concentration of the ozone in the housing; and means for controlling an amount of the ozone gas discharged from the housing based on an output of the means for detecting the concentration of the ozone.

* * * * *